Dec. 11, 1951    B. E. RICKS    2,578,645
IDLER ARM PIVOT JOINT
Filed Nov. 30, 1950
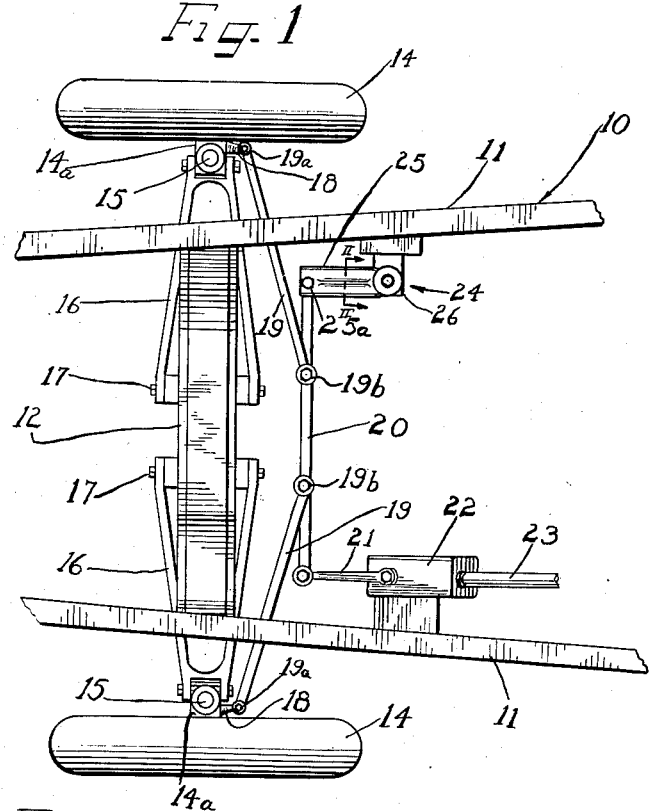
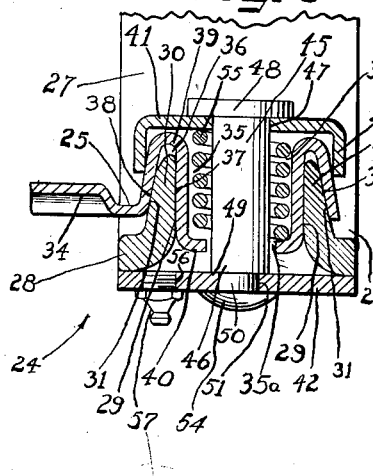
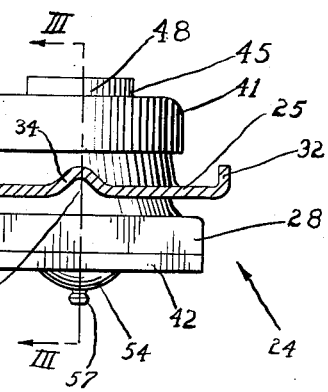
Inventor
Bernard E. Ricks Patented Dec. 11, 1951

2,578,645

UNITED STATES PATENT OFFICE 2,578,645

IDLER ARM PIVOT JOINT

Bernard E. Ricks, Detroit, Mich., assignor to Thompson Products, Inc., Cleveland, Ohio, a corporation of Ohio Application November 30, 1950, Serial No. 198,433

8 Claims. (Cl. 287—96)

This invention relates to a pivot joint adapted to be made from unmachined metal stampings.

More specifically, the invention relates to an automotive steering linkage idler arm pivot joint composed of a frame bracket with an upturned annular flange having a tapered outer bearing wall, an idler arm with an annular recess receiving the flange in pivot relation, caps overlying the recess defining portions of the idler arm and underlying the bracket to define closed ends for a grease chamber in the flange, a retaining stud extending through the chamber and the caps, and a spring acting around the stud on the idler arm to hold the annular recess defining walls thereof in good bearing contact with the flange of the bracket.

In many types of automotive steering linkages an idler arm is provided between the chassis frame and the end of a cross drag link. The other end of this cross link is pivotally mounted on the pitman arm and the tie rods, which are pivotally connected to the wheel arms, are connected to the cross link at points between the idler arm and pitman arm.

Since the idler arm is subjected to relatively light loads, it is particularly adapted to be made from sheet metal, and in accordance with this invention a stamped joint connection is provided between the idler arm and the frame bracket.

It is, therefore, an object of the present invention to provide a stamped metal idler arm installation embodying a stamped pivot joint.

Another object of the invention is to provide a pivot joint with a cup like member having a rim flange defining a recess around the cup, a bracket with a flange seated in said recess in rotatable relation therewith, and a spring acting on the cup bottom to hold the member and bracket in good bearing contact.

A further object of the invention is to provide a sheet metal idler arm having an annular recessed end portion receiving an annular flange of a connecting bracket in conforming bearing relation in order to provide a pivotal connection therebetween.

Still another object of the present invention is to provide a relatively light sheet metal idler arm pivotally connected to a relatively heavy metal bracket by means of an annular bracket flange having a radially outwardly tapered surface which is received in a conforming annular indentation in the idler arm together with retaining means for retaining the assembled idler arm and bracket in pivotal bearing relation and with resilient means for urging the mating tapered bearing surfaces into proper bearing contact to automatically take up wear therebetween.

Other and further objects of the invention will be apparent to those skilled in the art from the following detailed description of the annexed sheet of drawings which, by way of preferred example only, illustrate one embodiment of the invention.

On the drawings:

Figure 1 is a fragmentary plan view of an automotive steering linkage arrangement embodying an idler arm installation according to the present invention;

Figure 2 is a substantially enlarged fragmentary sectional view taken along line II—II of Figure 1 showing the end portion of the idler pivot arm and a connecting portion of the attaching bracket in elevation; and Figure 3 is a fragmentary sectional view taken along III—III of Figure 2 with the connecting stud and the lubricant fitting shown in elevation.

As shown on the drawings:

The top plan view shown in Figure 1 illustrates an automotive steering linkage arrangement mounted on a vehicle frame 10 including a pair of substantially longitudinal frame members 11 and a fixedly attached transverse frame member 12. A pair of steerable wheels 14 are mounted on each side of the frame 10 on stub axle equipped knuckle brackets or arms 14a. The knuckle arms 14a are pivotally mounted on king pins 15 carried by wheel suspension members 16 which are, in turn, pivotally attached at 17 to the transverse member 12 of the frame 10. Spring mechanisms (not shown) are disposed between the suspension members 16 and the frame 10 in order to allow resilient floating of the wheels 14 with respect to the frame.

For steering the wheels 14 steering arms 18, fixedly attached to each of the knuckle arms 14a, are connected through the rod joints 19a to the outer end portions of a pair of tie rods 19. The inner ends of the tie rods are, in turn, connected through the rod joints 19b to a cross link or drag link 20. One end of the link 20 is pivotally connected to a pitman arm 21, operated by a steering control mechanism 22 which swings the arm 21 in response to rotation of a steering column 23.

In order to pivotally support the other end of the drag link 20 an idler arm installation 24 is provided according to the present invention. The idler arm installation 24 comprises generally a pivot arm 25 pivotally connected at 25a to the adjacent end of the link 20. The other end of the arm 25 is pivoted to a substantially horizontal leg of an angle bracket 26 having its other leg fixedly attached to the vehicle frame 10.

As shown in Figures 2 and 3, the attachment bracket 26 has a substantially vertical leg 27 which may be fixedly attached to the frame 10 by any suitable means such as bolts or welding. An integral horizontal leg 28 has a substantially cylindrical aperture 29 formed vertically therethrough and defined by an upstanding annular flange 30 with a tapered or frustro-conical bearing surface 31 on the radially outward side thereof. The cylindrical aperture 29 with the tapered annular flange 30 having the tapered bearing surface 31 may be expeditiously formed by punching as in a punch press so that the metal at the free end of the flange will thin out as the cylindrical aperture is formed to provide the radially outward tapered surface. In order that this tapering of the annular flange 30 will be properly accomplished the attachment bracket 26 is formed of relatively heavy gauge metal which also serves to provide a rugged connecting means for attaching to the vehicle frame 10.

The idler pivot arm 25 may be expeditiously formed from relatively thin gauge metal and provided with longitudinal upturned side reinforcement flanges 32 and a longitudinal central rib 34 in order to rigidify the pivot arm. One end portion of the pivot arm 25 is formed with a cup 35 having a relatively deep open bottom closed top annular recess 36 therearound bounded by a radially outwardly facing inner wall 37 of cylindrical configuration, a radially inwardly facing wall 38 of substantially frusto-conical configuration and a rounded top 39. The recess 36 receives the bracket flange 30 therein with the cylindrical surfaces 29 and 37 and the tapered surfaces 31 and 38 in substantially conforming bearing contact. The corresponding relative lengths and widths of the bracket flange 30 and the pivot arm recess 36 are such that the free end of the flange does not extend to the end of the recess and the main portion of the pivot arm is substantially spaced from the main portion of the bracket arm 28 in order to allow for wide tolerances in fabrication and to provide considerable latitude for wear between the mating bearing surfaces.

The cup 35 has a reduced diameter aperture 35a at its lower end defined by an annular inturned flange 40.

The defining wall of the cup 35 may extend downwardly beyond the main body of the pivot arm 25 because there is no danger of interference with the main body of the bracket arm 28 since this wall extends within the bracket aperture 29. Such an extension of the wall increases the mating area of the cylindrical bearing surfaces in order to impart greater wearing characteristics thereto.

In order to provide means for holding the bracket 26 and the pivot arm 25 in assembled pivotal relationship and in order to prevent the ingress of dirt into the pivot joint and the egress of lubricant therefrom, a dust cap 41 is provided over the open top of the cup 35, and a dust washer 42 is disposed over the lower end of the bracket aperture 29. The dust cap 41 is of shallow bowl-like configuration with an annular edge flange 44 extending downwardly with its free edge in continuous peripheral contact with the radially outward surface of the outer defining wall of the annular recess 36. The dust washer 42 is flat and has its outward edge portion in continuous peripheral contact with the lower defining edge about the bottom opening of the bracket aperture 29.

A retaining pin or stud 45 has a shank 46 disposed substantially axially through the cup 35 and the aperture 35a in spaced relation thereto. The upper end portion of the shank 46 is disposed in a close fitting hole 47 through the center of the dust cap 41. A flat head 48 is formed at the upper end of the shank 46 and bears downwardly against the dust cap. At the lower end of the shank 46 is formed a shoulder 49. A short coaxial shank portion 50 of smaller diameter than the shank 46 extends downwardly from the shoulder 49 through a close fitting hole 51 in the washer 42. A head 54 is formed at the lower end of the shank 50 thus confining the edge portion of the dust washer 42 about the hole 51 between the shoulder 49 and the head.

If it is desired to have the parts of the joint assembly accessible for removal or repair, the portion of the stud comprising the shank 46 and the head 48 could be separate from the part comprising the shank 50 and the head 54 with a portion of the shank 50 threaded into an internally threaded hole (not shown) in the bottom end of the shank 46.

In order to insure proper bearing seating between the mating tapered bearing surfaces 31 and 38 and in order to provide automatic wear take up means therebetween, a coil compression spring 55 is disposed in the cup 35 about the shank 46 of the stud 45. At its lower end the spring 55 bears against the annular inturned flange 40 of the cup, and at its upper end the spring bears against the lower surface of the dust cap 41. Thus, the spring 55 resiliently urges the recessed end portion of the pivot arm 25 downwardly on the flange 30 of the bracket 26 and insures proper bearing contact between the tapered bearing surfaces. As wear occurs between the surfaces, the pivot arm 25 will be urged farther downwardly to compensate for such wear.

A lubricant fitting 57 is threaded through a threaded hole 56 in the dust washer 42. Therefore, lubricant may be forced through the fitting 57 into the space between the washers 41 and 42 to insure a supply of lubricant for the mating bearing surfaces of the joint.

From the above description it will be understood that the present invention provides an improved and simplified idler arm and pivot joint assembly which may be fabricated without machining.

It will be understood that modifications and variations may be effected without departing from the scope of the novel concepts of the present invention.

I claim as my invention:

1. In an automotive steering linkage an idler arm installation comprising a relatively heavy gauge sheet metal bracket having an aperture therethrough at one end portion defined by an annular upturned integral flange, said flange having a radially inward substantially cylindrical surface and a radially outward substantially frusto-conical surface, a relatively thin gauge sheet metal pivot arm having a substantially cylindrical depression therein forming a cup terminating at one end in a reduced diameter opening defined by an annular inturned flange and at the other end in an outturned flange defining an annular recess about the cup, said annular recess receiving said annular bracket flange in substantially conforming bearing relation therein, a dust washer disposed over the open end of said bracket aperture, a dust cap disposed over the open end of said cup, a stud having a shank portion disposed through said pivot arm depression and through said reduced diameter opening in spaced relation thereto and having its end portion fixedly attached to said dust washer and said dust cap to retain the same in fixed spaced relation and to retain the assembled bracket and pivot arm therebetween, a compression coil spring disposed about the shank of said stud in said cup, said spring acting between said annular flange and said dust cap to urge said pivot arm away from said dust cap to retain said mating frusto-conical bearing surfaces in proper bearing relation, and means for introducing lubricant into the space between the dust washer and the dust cap.

2. An idler arm installation comprising a sheet metal bracket having a cylindrical bearing aperture therethrough defined by an integral tapered annular flange forming an external substantially frusto-conical bearing surface, a sheet metal pivot arm having an apertured cup portion with an outturned flange defining an annular recess around the cup portion receiving the annular flange of the bracket therein, closures spanning the bracket aperture and the top of the cup portion, a stud extending through the cup portion secured to the closures, and a spring around the stud compressed between said inturned annular flange and the closure over the cup portion to urge the outturned flange of the cup portion toward the divergent end of the frusto-conical bearing.

3. An idler arm adapted for an automotive steering linkage which comprises a stamping having a rib reinforced elongated arm portion with an embossed cylindrical cup at one end thereof, said cup having an aperture through the closed end thereof and an outwardly and downwardly inclined annular flange at the open end thereof, said flange coacting with the outer wall of the cup to define an annular recess around the cup, and said downturned portion of the flange being integrally connected with said arm.

4. An idler arm adapted for an automobile steering linkage which comprises an elongated strip of sheet metal having upturned flanges along the length thereof, a cup-shaped embossment on one end of said strip, said embossment having an annular flange therearound in spaced relation therefrom and defining therewith an annular recess, said embossment having an aperture through the closed end thereof, and an inturned rim flange on said embossment surrounding said aperture.

5. A joint construction comprising a first joint part having an annular flange, a second joint part having a cylindrical cup in said flange, an outturned lip on said cup extending over said flange, a downturned leg on said lip surrounding said flange in bearing relation, said cup having an aperture through the bottom thereof, an inturned flange on said cup surrounding said aperture and defining a shoulder in the cup, a first closure spanning the cup at one end of the joint, a second closure spanning the first joint part at the other end of the joint, a stud holding said closures on the joint assembly, and a spring bottomed on one closure acting on said shoulder in the cup for maintaining the cup and flange in good bearing relation.

6. A joint assembly comprising a first member having an aperture therethrough bounded by an upstanding annular flange, a second member having an annular recess receiving said flange, closures spanning the ends of the joint and seated on the first and second members respectively, means holding said closures against the ends of said joint to define a closed space in the joint, means for introducing lubricant into said closed space, and spring means in said closed space compressed between one of said members and the closure seated thereon and urging the first and second members into good bearing relation.

7. A joint construction comprising a first member having an aperture therethrough with an upstanding annular flange, said annular flange having a tapered outer wall and a cylindrical inner wall, said tapered outer wall converging toward the free end of the flange, a second member having an annular recess with side walls respectively seated on the cylindrical inner wall and tapered outer wall of said flange, and spring means acting on said first and second members for urging said members together into good bearing relation.

8. An idler arm and bearing bracket assembly adapted for automobile steering linkages which comprises a mounting bracket having an aperture therethrough bounded by an upstanding annular flange, said annular flange having a cylindrical inner wall and a tapered outer wall converging toward the free end of the flange, an idler arm having an annular recess in the end thereof bounded by an inner wall rotatably received in said annular flange and an outer wall rotatably mounted on the tapered outer surface of the annular flange, and a spring acting on the mounting bracket and the idler arm for urging the annular bracket flange and said inner and outer walls of the idler arm into good bearing relation.

BERNARD E. RICKS.

REFERENCES CITED

The following references are of record in the file of this patent:

UNITED STATES PATENTS

| Number | Name | Date |
| --- | --- | --- |
| 1,004,237 | Brandes | Sept. 26, 1911 |
| 1,372,327 | Young | Mar. 22, 1921 |